United States Patent
Ancel et al.

(10) Patent No.: US 10,261,863 B2
(45) Date of Patent: Apr. 16, 2019

(54) RUNTIME FILE SYSTEM CONSISTENCY CHECKING DURING BACKUP OPERATIONS

(71) Applicant: International Business Machines Corporation, Armonk, NY (US)

(72) Inventors: Thomas Ancel, Noisy-le-Grand (FR); Robert W. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 15/045,651

(22) Filed: Feb. 17, 2016

(65) Prior Publication Data
US 2017/0235641 A1    Aug. 17, 2017

(51) Int. Cl.
*G06F 11/14* (2006.01)
*G06F 17/30* (2006.01)

(52) U.S. Cl.
CPC .... *G06F 11/1451* (2013.01); *G06F 17/30171* (2013.01); *G06F 17/30371* (2013.01); *G06F 2201/84* (2013.01)

(58) Field of Classification Search
CPC .......... G06F 11/1451; G06F 17/30171; G06F 17/30371; G06F 2201/84
See application file for complete search history.

(56) References Cited

U.S. PATENT DOCUMENTS

| 2005/0223043 | A1* | 10/2005 | Randal | G06F 17/30315 |
| 2011/0106764 | A1* | 5/2011 | Wu | G06F 11/1458 707/639 |

* cited by examiner

*Primary Examiner* — Taelor Kim
(74) *Attorney, Agent, or Firm* — Patterson + Sheridan, LLP

(57) ABSTRACT

The present disclosure relates to maintaining file system consistency on a mounted storage device in a computing system during system runtime. In one embodiment, a method generally includes locking access to a file stored in a file system on the mounted storage volume and metadata associated with the file. A computing system determines one or more properties associated with the file and examines the metadata for inconsistencies between the metadata and the determined properties. Upon determining that the metadata and the determined properties are consistent, the computing system generates a backup copy of the file, commits the backup copy to a backup data repository, and unlocks access to the file.

20 Claims, 5 Drawing Sheets

RUNTIME FILE SYSTEM CONSISTENCY CHECKING DURING BACKUP OPERATIONS

BACKGROUND

The present disclosure relates to file systems on computing systems, and more specifically to ensuring file system consistency while file backup operations are performed on a mounted storage volume.

File systems generally maintain data and metadata associated with a given file separately. A file system generally writes files as blocks of data at multiple locations on a storage device (e.g., for hard disk drives, a particular cylinder, track, and sector). Meanwhile, file systems maintain metadata information such as a directory structure, ownership, permissions, addresses for each file, and so on.

Operating systems on a computer sometimes encounter unrecoverable errors or power loss during regular operations (e.g., system backup operations), which may interrupt file read/write/modify operations. When such errors occur, an operating system may force a hard reboot, which may interrupt file operations and generate inconsistencies in the file system (e.g., deleted nodes marked in use, metadata pointing to unwritten data, space leaks, and so on). In some cases, inconsistencies may appear between metadata and file data for files that a user accesses only occasionally, which may result in some data loss. However, when inconsistencies appear in critical files, such as file system metadata tables or operating system libraries, the operating system may be unable to be booted or restored to normal operation successfully.

Typically, backup systems are configured to freeze a file system and access (or attempt to access) each file maintained in a file system to back up the files maintained in the file system to another destination (e.g., a network attached storage, backup media connected to a local computer, and so on). When backup operations encounter inconsistencies in file metadata, backup operations may fail, or the backup may include invalid data. In either case, backup operations may not generate a complete and accurate back up copy of the file system.

To prevent failures in creating a backup copy of the files maintained in the file system, a user can check the file system using a file system consistency check tool (e.g., the fsck utility in *nix operating systems or the chkdsk utility in Windows operating systems). Generally, a file system consistency check is performed on an unmounted file system to produce dependable results, as different file system information may exist in machine memory and on a storage device associated with a file system. If file consistency checks are performed on a mounted file system, disk corruption may occur. Performing a file system consistency check at boot time or when the file system is otherwise unmounted generally allows an operating system to attempt to repair file system errors (e.g., inconsistencies between files and associated metadata) but may keep a system offline for an extended period of time. Because file system errors may not always be present in critical files or files that are accessed regularly during normal system operations, performing a file system consistency check at boot time may extend system downtime without fixing critical errors. Additionally, due to service level guarantees or other availability requirements, a computing system may not be able to unmount a file system to perform a file system consistency check without violating the service level guarantees or availability requirements

SUMMARY

One embodiment disclosed herein includes a method for executing backup operations on a mounted storage volume in a computing system. The method generally includes locking access to a file stored in a file system on the mounted storage volume and metadata associated with the file. A computing system determines one or more properties associated with the file and examines the metadata for inconsistencies between the metadata and the determined properties. Upon determining that the metadata and the determined properties are consistent, the computing system generates a backup copy of the file, commits the backup copy to a backup data repository, and unlocks access to the file.

Another embodiment includes a computer-readable storage medium having instructions, which, when executed on a processor, performs an operation for executing backup operations on a mounted storage volume in a computing system. The operation generally includes locking access to a file stored in a file system on the mounted storage volume and metadata associated with the file. A computing system determines one or more properties associated with the file and examines the metadata for inconsistencies between the metadata and the determined properties. Upon determining that the metadata and the determined properties are consistent, the computing system generates a backup copy of the file, commits the backup copy to a backup data repository, and unlocks access to the file.

Still another embodiment includes a processor and a memory storing a program, which, when executed on the processor, performs an operation for executing backup operations on a mounted storage volume in a computing system. The operation generally includes locking access to a file stored in a file system on the mounted storage volume and metadata associated with the file. A computing system determines one or more properties associated with the file and examines the metadata for inconsistencies between the metadata and the determined properties. Upon determining that the metadata and the determined properties are consistent, the computing system generates a backup copy of the file, commits the backup copy to a backup data repository, and unlocks access to the file.

DETAILED DESCRIPTION

Backup systems are generally designed to access each file in a file system to create a full backup copy of the file system. When file system metadata and file data is consistent, backup operations generally result in the backup system successfully creating a backup. However, when backup operations attempt to access inconsistent data, the backup operations may fail to create a backup or include bad data in the backup. In some cases, file system inconsistencies may trigger a system error during backup operations, which may result in both backup operation failure and a system crash.

Backup systems generally attempt to freeze a file system before beginning backup operations on the file system. By freezing the file system, the backup system generally blocks other applications or services running on the computing system from modifying file data or metadata during backup operations. After the backup system generates a backup of the file system (e.g., at the block level), the backup system unfreezes the file system and allows applications and services running on the computing system to resume normal file operations (read/write/modify).

Embodiments presented herein describe techniques for performing file system consistency checks during backup operations on a mounted storage volume. By performing file system consistency checks during backup operations, a computing system can verify the integrity of the file system (and files stored in the file system) before backing up files. A backup system may bypass generating backup copies of files that are associated with inconsistent metadata, which may generally provide for the successful completion of backup operations and creation of a backup copy of a file system without including corrupted or otherwise incorrect data.

In one embodiment, a computing system includes a backup engine that performs a file consistency check for each file to be backed up during a backup session. For each file, the backup system examines the metadata for inconsistencies, such as unreferenced files, inconsistent link counters, and so on. For files with consistent metadata, the backup engine saves a backup copy of the file to a backup data store. When the backup engine detects an inconsistency in file metadata, the backup engine generally logs the file as potentially corrupted and proceeds to attempt to back up the next file in the file system. When backup operations are completed, the backup system can indicate to a user whether or not inconsistencies exist in the file system and recommend that a full file system consistency check be performed on the file system when the computing system is rebooted.

Figure 1:
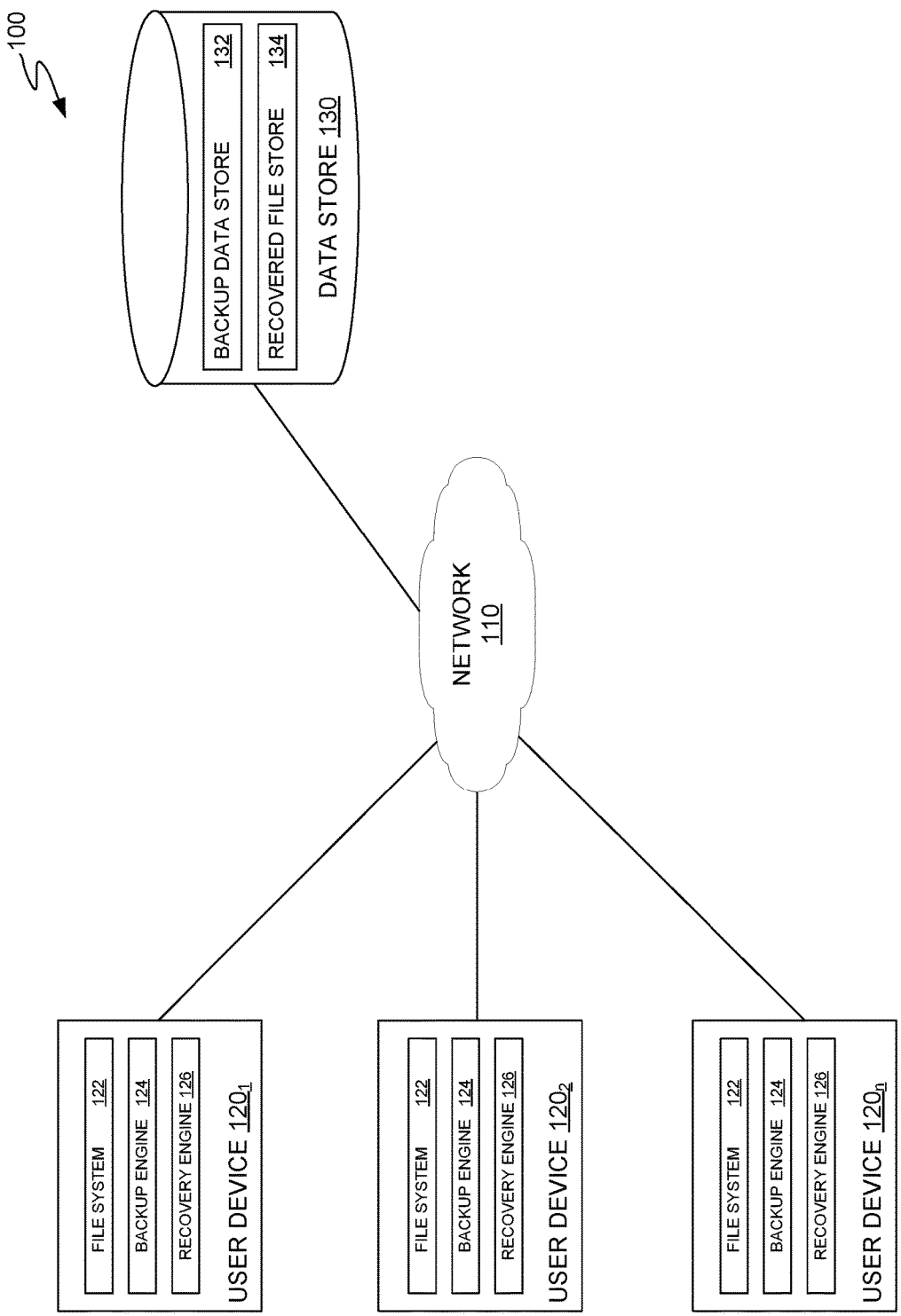
FIG. 1 illustrates an example networked computing environment that executes file system consistency checks during system runtime (e.g., during backup operations on a mounted storage volume), according to one embodiment.

FIG. 1 illustrates an example networked computing system 100, according to one embodiment. As illustrated, networked computing system 100 includes one or more user devices 120 and a data store 130, connected to a network 110.

A user device 120 generally includes a file system 122, a backup engine 124, and a recovery engine 126. As discussed above, file system 122 generally stores data in a set of storage blocks and maintains a data structure to store metadata associated with each file stored in file system 122. During regular system operations, processes update the metadata maintained in file system 122 for a given file as the processes access and/or modify a file. For example, when a process creates a file, the process writes a file bitstream to a location on a storage device connected to user device 120 (e.g., a local hard drive, a network file store, etc.) and writes metadata related to the file to a metadata structure. The metadata may include, for example, file creation and modification dates, a number of references to the file in other locations (e.g., shortcuts or links to a file), and so on.

In some cases, the metadata structure used by file system 122 residing on one or more storage devices (e.g., hard disk drives, solid state drives, and the like) may be represented by a tree structure and a reserved block of space (a "superblock") that stores information about the characteristics of file system 122 (e.g., block size, location of the tree structure, block map and usage information, and so on). File system 122 may replicate the superblock in one or more additional locations on the storage device to reduce the likelihood that user device 120 would not be able to mount the storage device (and consequently, the likelihood that processes executing on user device 120 would not be able to access data on the storage device).

The highest level of the tree structure may divide a storage device into a number of smaller blocks (e.g., directories) with a unique identifier. Generally, metadata for subdirectories (e.g., directories in a directory) may point to another node in the tree structure, while metadata for files stored in a directory may point to the location of the file on the storage device.

During regular operations, processes may attempt to access files stored in file system 122. During file access and read/write operations, a process using a file can store data and associated metadata to be written to a storage device in one or more buffers. Generally, when the process begins a file transaction, the process can flush the data in the one or more buffers to the storage device, which updates the storage blocks used by the file to reflect the most recent update to the file.

Backup engine 124 is generally configured to perform backup operations according to an executable file, script, or other procedure. Backup engine 124 may be configured to, for example, generate a full backup copy of file system 122 every n days and generate differential backups relative to the previous backup (whether a full or differential backup) every m days. During backup operations, which may execute during system runtime, backup engine 124 generally attempts to freeze file system 122 before beginning backup operations. By freezing file system 122, backup engine 124 can attempt to ensure that the backup operations complete successfully (e.g., create a backup copy that includes correct, uncorrupted data that a user can use to restore user device 120 to a previous state).

In some cases, when backup engine 124 freezes file system 122, backup engine 124 can block other processes from modifying data stored in file system 122 and the metadata structures belonging to file system 122. Freezing file system 122 may include flushing the one or more buffers associated with the file to the storage device, which commits pending changes to the files on the storage device and updates the metadata associated with the files on the storage device. File system 122 additionally blocks any other processes from executing other transactions on the file (e.g., prevents other processes from writing data or metadata to the storage device).

Generally, during backup operations, backup engine 124 accesses each file stored on file system 122 and attempts to make a copy of each file and the associated metadata. To prevent backup engine 124 from causing a system crash by attempting to access corrupt data (e.g., accessing corrupt nodes in the file system), backup engine 124 can perform file consistency checks on each file before backing up the file.

To perform file consistency checks during system runtime, backup engine 124 begins by freezing file system 122. When backup engine 124 freezes file system 122, as discussed above, backup engine 124 can force any buffers with data to be committed to files stored in file system 122 to either write the contents of the buffers to the appropriate file locations or discard the buffer contents. After backup engine 124 flushes the one or more buffers associated with files in file system 122, backup engine 124 can begin backup and file consistency check operations.

After backup engine 124 freezes file system 122, backup engine 124 generally creates a temporary block map and tree structure to keep track of blocks and file system nodes while the backup operations execute. For each file and directory in the file system, backup engine 124 can create a database to correlate filenames with identified nodes in the tree structure. In some cases, backup engine 124 generates the database starting with the root directory and proceeding through each folder in the directory tree.

After creating the temporary block map, tree structure, and directory, backup engine 124 can examine each node on the tree structure (which may represent one or more files stored in file system 122) for consistency between metadata associated with a file and the actual properties of the file. For each node, backup engine 124 examines the associated metadata (e.g., block identifiers, location pointers, usage counters, and so on) for potential inconsistencies and other information that backup engine 124 can use to determine whether or not to create a backup copy of the file.

In some cases, if backup engine 124 does not detect inconsistencies between metadata associated with a file and the actual file, backup engine 124 can make a backup copy of the file and commit the backup copy of the file to a backup data store (e.g., a local destination, such as a portable hard drive, or an networked destination, such as a local network share or distributed storage in the cloud).

If, however, backup engine 124 detects inconsistencies between metadata associated with a file, backup engine 124 can log the inconsistency in a log file and attempt to back up the next file (or node) in file system 122. When backup engine 124 completes backup operations on file system 122, backup engine 124 can examine a log file to determine if the backup operations on file system 122 failed to generate backup copies of some files in file system 122. If so, backup engine 124 can generate an alert to indicate to a user or system administrator that file system 122 is in an inconsistent state and recommend that the user perform a file system consistency check on file system 122 in the future (e.g., when file system 122 is unmounted).

In some cases, backup engine 124 may flag temporary files as a potential file system inconsistency while performing backup operations on file system 122. In one example, backup engine 124 may detect that a file is a temporary file if the file has been deleted but is still referenced. Backup engine 124 may bypass generating backup copies of these temporary files. In some cases, however, temporary files may include data that is useful for future reference, and backup engine 124 may generate a backup copy of a temporary file and save the backup copy in a temporary file repository for user device 120.

For example, in some cases, as described above, file system consistency checking may reveal that a file is unreferenced in the file system (e.g., no directory entry exists for the file/node) but has a stored link count indicating that those files are referenced in the file system. In one example, a link count of 0 for a file may indicate that the file is unreferenced in file system 122, but the file may have a non-zero reference count in file metadata. These files, which may not be visible to a user but are being used by one or more programs on user device 120, may be referred to as temporary files. Backup engine 124 may recover temporary files into a special directory (e.g., a recovered files directory or a "lost+found" directory) and generate a backup copy of the file to save in a backup repository.

After backup engine 124 completes generating a backup of uncorrupted files in file system 122, recovery engine 126 can verify that the backup operations completed successfully. To verify the backup, recovery engine 126 can restore the backup to a different storage device or partition. Subsequently, recovery engine 126 can run a file system consistency check on the storage device or partition on which the backup was restored. If the file system consistency check did not generate any errors, the backup operations completed successfully, and backup engine 124 may finalize the backup operations. In finalizing the backup operations, backup engine 124 can commit the backup to a designated storage device (e.g., a portable hard drive or solid state drive, local network attached storage, cloud-based storage, and so on). In some cases, committing the backup to a designated storage device may include compressing the backup, which may allow for additional backup copies of file system 122 to be generated and stored on the designated storage device. Backup engine 124 may additionally write data about the backup to a database or other backup data log to indicate when the backup was generated, whether the backup is a full or differential backup, and so on. Additionally, backup engine 124 can clean up the storage device or partition on which recovery engine 126 restored the backup for verification. Finally, backup engine 124 may unfreeze file system 122 and allow regular read/write/modify operations to be performed on files and file metadata residing in file system 122.

If, however, recovery engine 126 detects an error during file system consistency checks on the storage device or partition on which the backup was restored, backup engine 124 can determine that the backup operations were unsuccessful (e.g., the backup includes inconsistent data). In some cases, backup engine 124 can delete the backup copy from the designated storage device and clean up the storage device or partition on which recovery engine 126 restored the backup for verification. File system 122 may remain frozen until backup engine 124 successfully completes backup operations and unfreezes the file system.

Recovery engine 126, as discussed above, generally receives a backup of file system 122 from backup engine 124 to verify that the backup operations generated a good backup (e.g., a backup of file system 122 that does not include inconsistencies between files and associated file metadata). Recovery engine 126 can restore the backup of file system 122, which may include boot records, file allocation tables, and so on, to another storage device or partition on user device 120 (e.g., an unused storage device or partition or a storage device or partition dedicated to the backup system). After recovery engine 126 restores the backup to a designated storage device or partition on user device 120, recovery engine 126 can run a file system consistency check on the storage device or partition on which the backup was restored. If the file system consistency check returns without finding any errors, recovery engine 126 can notify backup engine 124 that the backup operations completed successfully. Otherwise, if the file system consistency check detected errors on the storage device or partition on which the backup was restored, recovery engine 126 can notify backup engine 124 that the backup operations were unsuccessful.

Data store 130 generally provides a storage repository for backup system 124 to store backups generated for a user device 120 and, in some cases, data recovered while performing file system consistency checks during system runtime. As illustrated, data store 130 may include a backup data store 132 and recovered file store 134.

Backup data store 132 may include a database that maintains a list of backups for each of the one or more user devices 120 and the location of each backup in data store 130. In some cases, a first backup for a user device 120 may be a full system backup and successive backups for the same user device 120 may be a differential backup, or a backup that saves changes made to files on user device 120 since the previous backup.

Recovered file store 134 may include a directory for each of the one or more user devices 120 to store recovered (and/or temporary) files, which, as discussed above, may be files that are not referenced in a file system but have an associated link count in the metadata structure of a file system 122 at a user device 120. In some cases, when file system consistency checks recover files on a user device 120, file system 122 (or backup engine 124) can generate a subdirectory in the appropriate user device directory to store recovered files.

Figure 2:
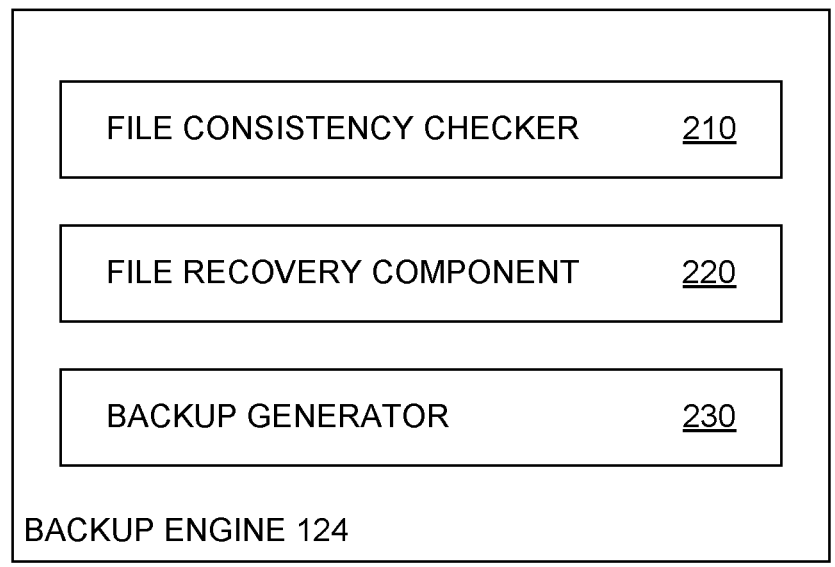
FIG. 2 illustrates an example backup engine that performs file system consistency checks during system runtime, according to one embodiment.

FIG. 2 illustrates an example backup engine 124 that performs file system consistency checks while generating a system backup of a user device 120, according to one embodiment. As illustrated, backup engine 124 generally includes a file consistency checker 210, a file recovery component 220, and a backup generator 230.

As discussed above, file consistency checker 210 can generate a copy of the file system metadata structure and examine each node in the metadata structure for potential inconsistencies in the metadata associated with each file. After generating a copy of the system metadata structure, file consistency checker 210 generally examines the metadata associated with each node and scans for file cross linking, inconsistencies between a link count in the metadata and an actual link count, referenced files with an actual count of 0 (e.g., orphaned files, temporary files, files that were deleted while another process was using the file, etc.), and so on. If file consistency checker 210 determines that the metadata associated with a file is consistent, file consistency checker 210 passes control of the file to backup generator 230. Otherwise, file consistency checker 210 passes control of the file to file recovery component 220.

File recovery component 220 generally attempts to reconcile inconsistencies between actual file properties and the stored metadata associated with a file (e.g., link counts, block usage, etc.). If, for example, file consistency checker 210 detects a discrepancy between a stored link count and a calculated link count, file recovery component 220 can correct the stored link count to the calculated link count. In some cases, where the stored link count is a non-zero value and the actual link is 0, which indicates that a file has been disconnected (e.g., not linked to any directory entry), file recovery component can move the file to a recovered file repository or directory (e.g., a "lost+found" directory). In both cases, file recovery component 220 may subsequently transfer control of the file to backup generator 230.

In some cases, file recovery component 220 may fail to reconcile inconsistencies in the metadata associated with a given file. For example, the metadata may point to storage blocks that are actually unused, corrupted storage blocks, or other data that renders a file unusable. In such a case, file recovery component 220 may log the file as unrecoverable. File recovery component 220 may additionally modify a metadata structure on file system 122 to remove any references to an unusable file. Additionally, because the file is unusable, file recovery component 220 need not transfer control of the file to backup generator 230 to create a backup copy. File recovery component 220 may signal to file consistency checker 210 that file recovery component 220 failed to recover the file and instruct file consistency checker 210 to proceed to perform file consistency checks on another file.

Backup generator 230 generally receives access to a file to generate a copy of the file to save in a backup repository (e.g., backup data store 132 on data store 130) after file consistency checker 210 and/or file recovery component 220 completes processing the file. Backup generator 230 may make a bitwise copy of each accessible file stored in file system 122 on user device 120 and save the copy to a data store, such as a removable hard disk drive or solid state drive or network storage. If backup generator 230 generates differential backups of a user device relative to a previous backup, backup generator 230 may examine previous system backups for information about the accessed file. If the accessed file has not changed since the previous backup, backup generator 230 need not create a backup copy of the file. If, however, the accessed file has changed between backup operations, backup generator 230 may make a bitwise copy of the file or copy only the modified portions of the file and generate a log file identifying the modified portions of the file. In some cases, after backup generator 230 completes generating bitwise copies of each accessible file stored in file system 122, backup generator 230 may additionally compress the backup to reduce the size of each system backup.

Figure 3:
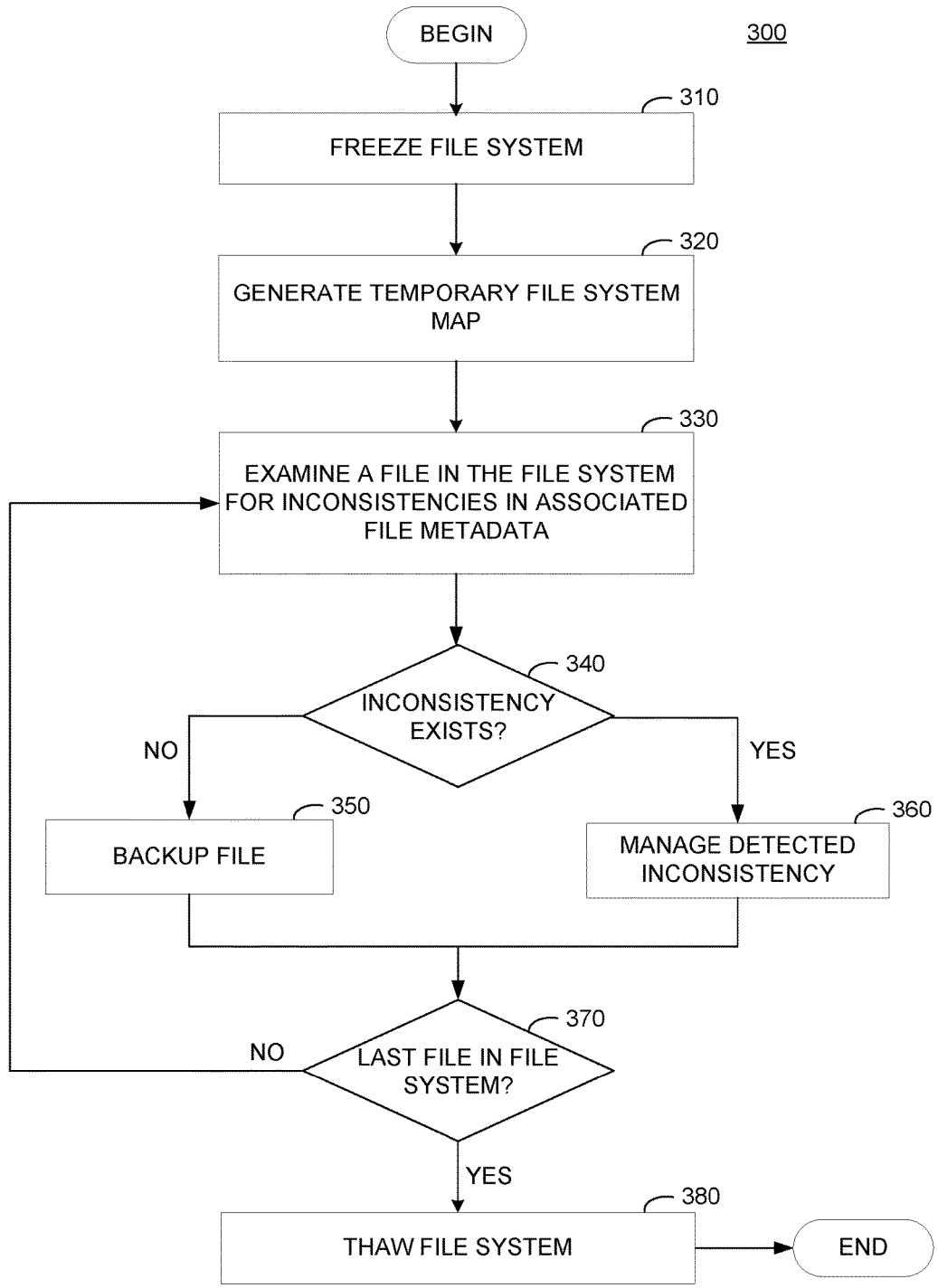
FIG. 3 illustrates example operations that may be performed by a computing system to perform file system consistency checks during backup operations, according to one embodiment.

FIG. 3 illustrates example operations that may be performed by a computing system to perform file system consistency checks during backup operations, according to one embodiment. As illustrated, operations 300 begin at step 310, where the computing system freezes the file system. As discussed above, freezing the file system generally forces one or more buffers associated with various files in the file system to commit changes to data and metadata and may prevent processes from modifying files and/or file metadata or otherwise modifying the file system until the computing system thaws file system. In some cases, freezing the file system may include beginning backup operations on the file system.

At step 320, the computing system generates a temporary file system map. The temporary file system map may be, for example, a copy of the file system structure. Based on the temporary file system map, the computing system generates a database of file names with the associated nodes in the temporary file system map.

At step 330, the computing system examines a file for inconsistencies in the associated file metadata. As discussed above, the computing system can examine file metadata for inconsistencies in stored link counts, cross-linking of different files to the same blocks on a storage device, and so on. Inconsistencies in stored link counts may indicate, for example, failed updates to the metadata associated with a file, dropped connections between a file and a directory entry, file corruption, and so on.

At step 340, the computing system determines if an inconsistency exists. If no inconsistencies exist, at step 350, the computing system backs up the file. As discussed above, the computing system can create a bitwise copy of the file and store the copy of the file on another storage device, such as an external hard drive or solid state drive connected to a user device, network attached storage, a remote backup repository, or other storage location. In some cases, as discussed above, the computing system can additionally compress the copy of the file to reduce the size of the backup.

If, however, the computing system detects an inconsistency in file metadata, at step 360, the file system manages the detected inconsistency. As discussed in further detail below, the file system can deal with the inconsistency by logging the inconsistency if the file is unrecoverable. If the file is recoverable, the file system can deal with the inconsistency by recovering the file (e.g., to a recovered file directory) and backing up the file.

At step 370, the computing system determines if the examined file was the last file in the file system. If so, at step 380, the computing system thaws the file system, which allows processes executing on a user device to modify data in the file system (e.g., add files to the file system, remove files from the file system, and/or modify files and associated file metadata). Otherwise, the computing system returns to step 330 to perform file consistency checks and generate a backup copy of another file stored in the file system.

Figure 4:
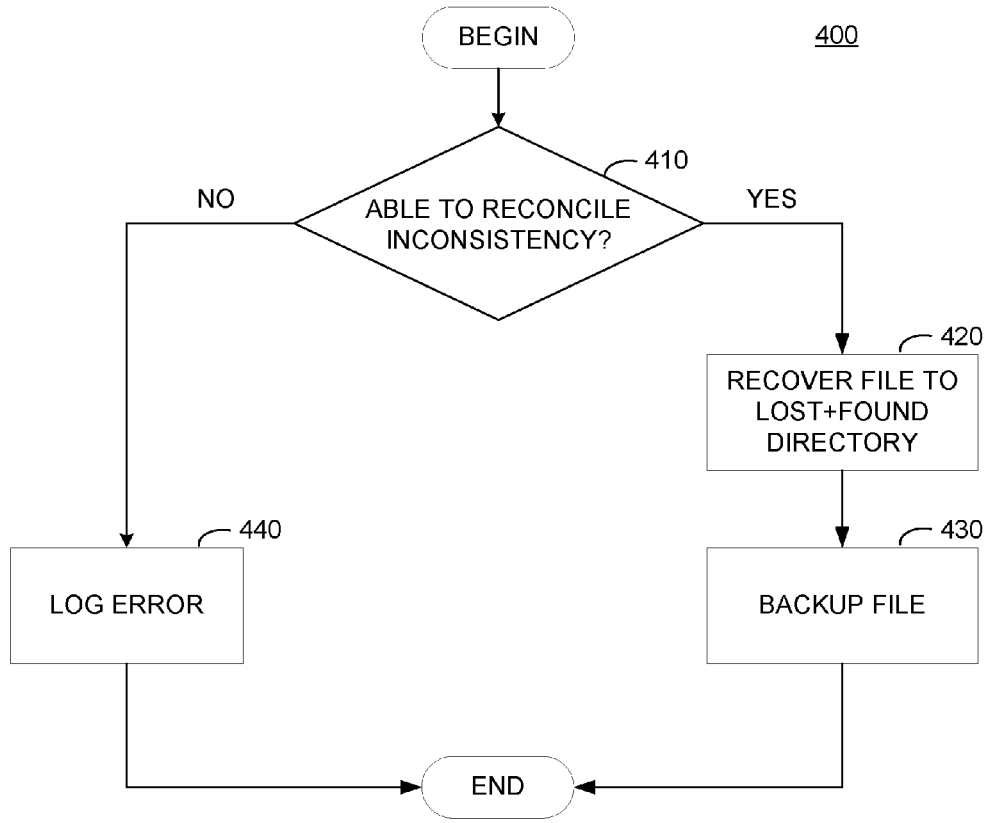
FIG. 4 illustrates example operations that may be performed by a computing system to handle file inconsistencies during backup operations, according to one embodiment.

FIG. 4 illustrates example operations that may be performed to manage file inconsistencies detected during backup operations, according to an embodiment. As illustrated, operations 400 begin at step 410, where the computing system determines if the file system is able to reconcile an inconsistency detected in file metadata. If the file system is able to reconcile the detected inconsistency, at step 420, the computing system recovers the file to a recovered file (or "lost and found") directory. The computing system can determine that a detected inconsistency is reconcilable, for example, if the file is not associated with a directory (e.g., the file has a link count of zero and a non-zero reference count) but the contents of the file system may remain in the file system. In such a case, the file may be named based, at least in part, on a number of the node associated with the file. At step 430, the computing system backs up the recovered file, as discussed above.

If, however, the computing system determines that the inconsistency cannot be reconciled, at step 440, the file system logs the inconsistency. In logging the inconsistency, the file system can write information identifying the file to an inconsistency log and identify the file as unrecoverable. After backup operations are completed, a backup system can examine the inconsistency log, and based on the logged events, indicate to a user that certain files have not been backed up and recommend that a full file system consistency check should be performed in the future (e.g., when the file system is unmounted).

Figure 5:
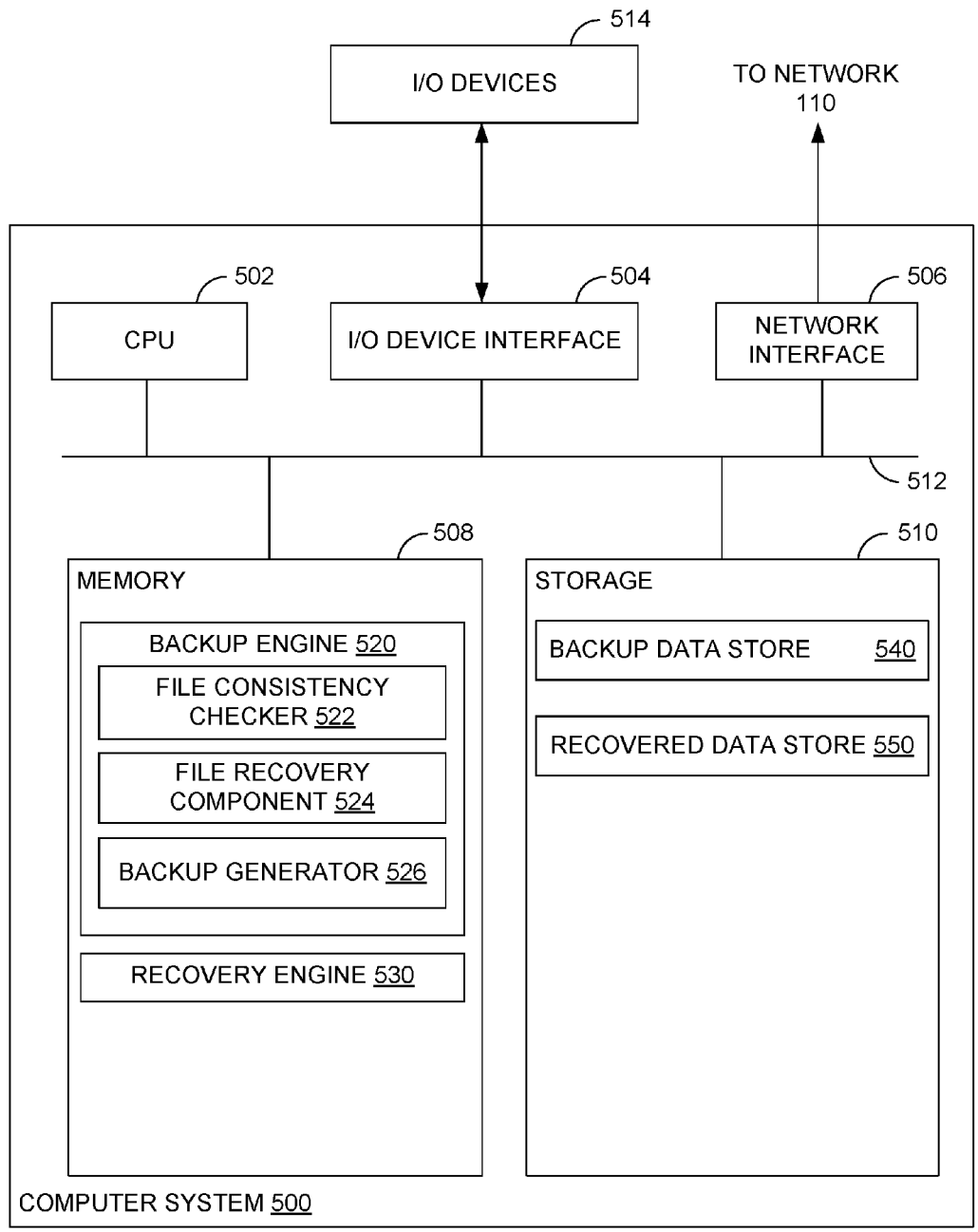
FIG. 5 illustrates an example computing system for performing file system consistency checks during backup operations, according to one embodiment.

FIG. 5 illustrates an example user device 500 that cooperates with other peer devices (e.g., connected to the same network) to select one or more device to offload a command for processing by a cloud service, according to an embodiment. As shown, the server includes, without limitation, a central processing unit 502, one or more I/O device interfaces 504, which may allow for the connection of various I/O devices 514 (e.g., keyboards, displays, mouse devices, pen input, etc.) to the computing system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a backup engine 520 and a recovery engine 530. Backup engine 520 generally includes a file consistency checker 522, file recovery component 524, and a backup generator 526. As discussed above, file consistency checker 522 examines each file in a file system for inconsistencies in file metadata associated with a file. File consistency checker 522 may perform file consistency checks during system runtime or as part of a backup operation. Consistent metadata may include, for example, a correct link count (e.g., a correct number of directories are identified as including a link to the file), references to the correct blocks of data, and so on. If file consistency checker 522 identifies that stored metadata is inconsistent, file consistency checker 522 passes control of the file to file recovery component 524 to attempt to reconcile inconsistencies in the stored metadata.

File recovery component 524, as discussed above, is generally configured to examine a file system for information about a particular file (e.g., the number of directories that include a link to a file). For example, file recovery component 524 can write a correct link count to the file metadata. In some cases, if file metadata indicates that a directory includes a link to the file but the actual link count is 0, file recovery component 524 may restore a link to the file in a recovered file directory (e.g., a "lost+found" directory). In some cases, file recovery component 524 may fail to reconcile file metadata (e.g., due to issues such as file cross-linking, erroneous links to storage blocks, and so on). In such a case, file recovery component 524 may determine that a file is unrecoverable and alert a user or system administrator to a data loss event related to the file.

Backup generator 526 is generally configured to generate system backups for files stored on computer system 500. Backup generator 526 may receive access to a file after file consistency checker 522 and/or file recovery component 524 (e.g., after file recovery component 524 remedies inconsistencies in file metadata). Upon receiving access to a file, backup generator 526 can create a bitwise copy of the file and commit the backed up copy of the file to a data store (e.g., a networked data store or storage 110 on computer system 500. In some cases, backup generator 526 may additionally compress backed up copies of files to allow for additional system backups to be generated and stored in a backup repository.

Recovery engine 530 generally allows computer system 500 to verify that backups operations performed by backup engine 520 have completed successfully. Recovery engine 530 is generally configured to restore a backup created by backup engine 520 to storage 510 (e.g., using a temporary partition on a solid state drive or hard disk drive). After recovery engine 530 restores the backup to storage 510, recovery engine can verify that the backup operations completed successfully by running a file system consistency check operation on partition or device on which recovery engine 530 restored the backup. If the file system consistency check passes, recovery engine 530 can determine that the backup operations completed successfully and commit the backup to backup repository 530. Otherwise, the backup operations have failed, and recovery engine 530 can discard the backup and instruct backup engine 520 to restart backup operations on the specified locations.

As shown, storage 510 includes backup data store 530 and recovered data store 540. Backup data store 530 generally provides a storage repository for system backups generated for computing system 500. As discussed above, backup data store 530 may, in some cases, include a database identifying each system backup (e.g., by date) and identify whether the backup is an initial backup (e.g., a full system backup) or a differential backup (e.g., a backup relative to a previous backup). Recovered data store 540 generally provides a storage repository for "orphaned" files, or files with metadata indicating that the file was not removed but an actual link count of 0. As discussed above, as file recovery component 524 encounters such files, file recovery component 524 can overwrite the metadata associated with the file to indicate that the file is linked to (e.g., stored in) recovered data store 540.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for performing backup operations in a computing system, comprising:
    locking access to a first file and a second file stored in a file system on a mounted storage volume;
    locking access to first metadata associated with the first file and second metadata associated with the second file;
    prior to backing up either the first file or the second file:
        generating a temporary block map representing the file system, wherein the temporary block map comprises a plurality of nodes, wherein each of the plurality of nodes represents one or more files stored in the file system;
        determining a first actual property associated with the first file based on the temporary block map;
        examining the first metadata to determine a first metadata property associated with the first file;
        determining a second actual property associated with the second file based on the temporary block map; and
        examining the second metadata to determine a second metadata property associated with the second file;
    upon determining that the first metadata property and the first actual property are consistent:
        generating a backup copy of the first file; and
        committing the backup copy to a backup data repository;
    determining that the second metadata property and the second actual property are inconsistent; and
    unlocking access to the first and second files, wherein the second file is not backed up.

2. The method of claim 1, wherein locking access to the first and second files comprises:
    committing pending changes to the first and second files stored in one or more buffers to one or more locations in the file system;
    updating the first and second metadata based on the committed changes; and
    blocking other running processes from accessing the first and second files.

3. The method of claim 1, further comprising:
    upon determining that the second metadata property and the second actual property are inconsistent, logging the inconsistency in a file system inconsistency log.

4. The method of claim 3, further comprising logging an indication that the second file was not backed up in an error log.

5. The method of claim 3, further comprising:
    determining, based on the second metadata and the second actual properties, that the second file is recoverable;
    recovering the second file into a recovered file directory on the file system; and
    backing up the recovered file into the backup data repository.

6. The method of claim 5, wherein determining that the second file is recoverable comprises:
    determining that the second file is referenced in the file system, but that the second metadata has a link count of zero.

7. The method of claim 1, wherein generating a backup copy of the first file comprises:
    identifying differences between the first file and a previously backed up copy of the first file; and
    committing the differences between the first file and the previously backed up copy of the first file to the backup data repository.

8. A computer program product, comprising: a computer-readable storage medium having computer readable program code embodied therewith, the computer readable program code configured to perform an operation to execute backup operations on a mounted storage volume in a computing system, the operation comprising:
    locking access to a first file and a second file stored in a file system on the mounted storage volume;
    locking access to first metadata associated with the first file and second metadata associated with the second file;
    prior to backing up either the first file or the second file:
        generating a temporary block map representing the file system, wherein the temporary block map comprises a plurality of nodes, wherein each of the plurality of nodes represents one or more files stored in the file system;
        determining a first actual property associated with the first file based on the temporary block map;
        examining the first metadata to determine a first metadata property associated with the first file;
        determining a second actual property associated with the second file based on the temporary block map; and
        examining the second metadata to determine a second metadata property associated with the second file;
    upon determining that first metadata property and the first actual property are consistent:
        generating a backup copy of the first file; and
        committing the backup copy to a backup data repository;
    determining that the second metadata property and the second actual property are inconsistent; and
    unlocking access to the first and second files, wherein the second file is not backed up.

9. The computer program product of claim 8, wherein locking access to the first and second files comprises:
    committing pending changes to the first and second files stored in one or more buffers to one or more locations in the file system;
    updating the first and second metadata based on the committed changes; and
    blocking other running processes from accessing the first and second files.

10. The computer program product of claim 8, wherein the operations further comprise:
    upon determining that the second metadata property and the second actual property are inconsistent, logging the inconsistency in a file system inconsistency log.

11. The computer program product of claim 10, wherein the operations further comprise:

determining, based on the second metadata and the second actual properties, that the second file is recoverable;

recovering the second file into a recovered file directory on the file system; and backing up the recovered file into the backup data repository.

12. The computer program product of claim 11, wherein determining that the second file is recoverable comprises:

determining that the second file is referenced in the file system, but that the second metadata has a link count of zero.

13. The computer program product of claim 8, wherein generating a backup copy of the first file comprises:

identifying differences between the first file and a previously backed up copy of the first file; and committing the differences between the first file and the previously backed up copy of the first file to the backup data repository.

14. A system, comprising:

a processor; and a memory storing instructions, which, when executed on the processor, perform an operation to execute backup operations on a mounted storage volume in a computing system, the operation comprising:

locking access to a first file and a second file stored in a file system on the mounted storage volume;

locking access to first metadata associated with the first file and second metadata associated with the second file;

prior to backing up either the first file or the second file:

generating a temporary block map representing the file system, wherein the temporary block map comprises a plurality of nodes, wherein each of the plurality of nodes represents one or more files stored in the file system;

determining a first actual property associated with the first file based on the temporary block map;

examining the first metadata to determine a first metadata property associated with the first file;

determining a second actual property associated with the second file based on the temporary block map; and examining the second metadata to determine a second metadata property associated with the second file;

upon determining that the first metadata property and the first actual property are consistent:

generating a backup copy of the first file; and committing the backup copy to a backup data repository; and determining that the second metadata property and the second actual property are inconsistent; and unlocking access to the first and second files, wherein the second file is not backed up.

15. The system of claim 14, wherein locking access to the first and second files comprises:

committing pending changes to the first and second files stored in one or more buffers to one or more locations in the file system;

updating the first and second metadata based on the committed changes; and blocking other running processes from accessing the first and second files.

16. The system of claim 14, wherein the operations further comprise:

upon determining that the second metadata property and the second actual property are inconsistent, logging the inconsistency in a file system inconsistency log.

17. The system of claim 16, wherein the operations further comprise:

logging an indication that the second file was not backed up in an error log.

18. The system of claim 16, wherein the operations further comprise:

determining, based on the second metadata and the second actual properties, that the second file is recoverable;

recovering the second file into a recovered file directory on the file system; and backing up the recovered file into the backup data repository.

19. The system of claim 18, wherein determining that the second file is recoverable comprises:

determining that the second file is referenced in the file system, but that the second metadata has a link count of zero.

20. The system of claim 14, wherein generating a backup copy of the first file comprises:

identifying differences between the first file and a previously backed up copy of the first file; and committing the differences between the first file and the previously backed up copy of the first file to the backup data repository.

* * * * *